United States Patent [19]

Sessions

[11] 4,327,940

[45] May 4, 1982

[54] GASOLINE PUMP DISPLAY CONVERSION KIT

[76] Inventor: J. Don Sessions, Star Rte., Ketchum, Id. 83340

[21] Appl. No.: 233,025

[22] Filed: Feb. 9, 1981

Related U.S. Application Data

[63] Continuation-in-part of Ser. No. 21,981, Mar. 19, 1979, abandoned.

[51] Int. Cl.³ .................................................. G01P 1/08
[52] U.S. Cl. .......................................... 283/21; 283/62; 116/62.2; 116/DIG. 47; 235/94 R
[58] Field of Search ........................ 116/62.1, 62, 62.2, 116/DIG. 47; 235/71 A, 94 R; 283/1 R, 18, 19, 20, 21, 22, 61, 62

[56] References Cited

U.S. PATENT DOCUMENTS

| | | | |
|---|---|---|---|
| 3,605,681 | 9/1971 | Davies | 116/DIG. 47 |
| 3,863,839 | 2/1975 | Batson | 235/94 R |
| 4,054,105 | 10/1977 | Fegan | 116/62.2 |
| 4,108,103 | 8/1978 | Ammar | 116/DIG. 47 |

FOREIGN PATENT DOCUMENTS

| | | | |
|---|---|---|---|
| 1238653 | 7/1971 | United Kingdom | 116/DIG. 47 |
| 1251425 | 10/1971 | United Kingdom | 283/18 |

OTHER PUBLICATIONS

Sun Oil Co., New Jersey, Nov. 1974, Study by Opinion Research Corporation, p. i.

*Primary Examiner*—Paul A. Bell
*Attorney, Agent, or Firm*—Trask & Britt

[57] ABSTRACT

A conversion kit for converting the display wheels of a conventional gasoline pump to increase the money value display is disclosed. The kit comprises numbered adhesive strips which are sized to fit the circumference of one or more of the display wheels of a conventional gasoline pump display panel. Strips are applied to the one cent wheel to convert the wheel to a zero to one dollar wheel. The conversion permits the price display wheels to rotate at a much slower speed. The conversion kit further enables the pump display to register a larger money sale.

7 Claims, 6 Drawing Figures

Fig. 1

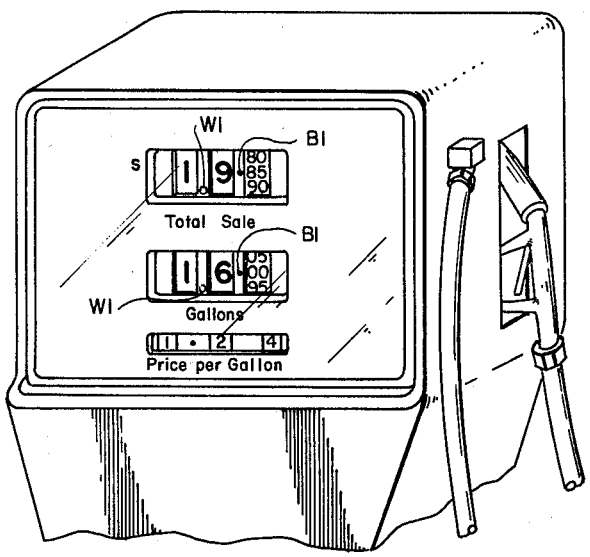
Fig. 2
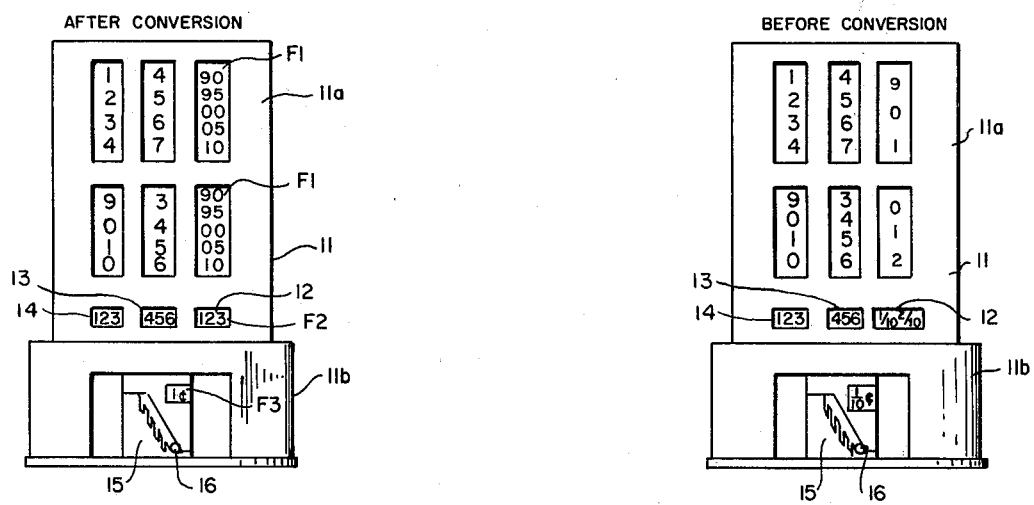
Fig. 4 Fig. 3
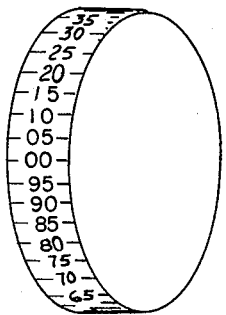 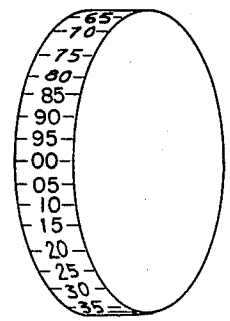
Fig. 5 Fig. 6

GASOLINE PUMP DISPLAY CONVERSION KIT

RELATED APPLICATIONS:

This application is a continuation-in-part of application Ser. No. 21,981, filed on Mar. 19, 1979 by applicant now abandoned.

BACKGROUND OF THE INVENTION

1. Field:

This invention relates to conversion kits for gasoline pump display panels.

2. Prior Art:

Conversion kits for converting gasoline pumps to display volume pumped as liters rather than gallons are described in U.S. Pat. No. 3,863,839.

A decal kit for converting a speedometer dial to display kilometers is illustrated in U.S. Pat. No. 4,108,103.

OBJECTS OF THE INVENTION

It is an object of the instant invention to provide a kit containing adhesive strips containing numbers thereon which may be readily applied to the display wheels of a gasoline pump display panel.

A further object of the instant invention is to provide a kit containing all the numbered strips required to convert all aspects of a gasoline pump computer and display to increase by a tenfold the number capable of being displayed.

A further object of the instant invention is to provide a conversion kit which may be easily applied, is durable and enables the display wheels of the total sale price to run at a slower speed.

DESCRIPTION OF THE DRAWINGS

FIG. 1 is a planar view of the various numbered strips contained in a conversion kit of this invention;

FIG. 2 is a perspective view of a gasoline pump showing the informational display after conversion;

FIG. 3 is an elevational view of the display wheels of the gasoline pump computer prior to conversion;

FIG. 4 is an elevational view of the display wheels of the gasoline pump computer after conversion;

FIGS. 5 and 6 are perspective views of replacement display wheels for gasoline pump computers.

DESCRIPTION OF THE INVENTION

A conversion kit for converting the display wheels of a conventional gasoline pump computer display panel to increase the money value which the computer is capable of displaying has been invented. The kit is comprised of a number of adhesive-backed linear strips. The adhesive is preferably a pressure sensitive adhesive. The kit typically contains at least one first adhesive-backed linear strip approximately one foot in length. This first linear strip is sized to fit about the circumference of a one cent wheel of a computer which conventionally reads from zero cents to nine cents to display a cents portion of a particular sale. The first linear strip is numbered from zero to 95 with 100 equally spaced marks thereon. The numbers appear in sequence at every fifth mark. The numbers are oriented to be read when the strip is in a vertical position. The strip preferably has white numerals against a black background to conform with the white numerals typically found on a gasoline pump display.

The sizing of the strip is such that when the strip is applied to the circumference of a wheel, the ends of a strip meet so that the numbers read continuously as the wheel is rotated. Most gasoline pump computers have two displays on opposite sides of the face of the pump. The cent wheels of such displays generally run in opposite directions so that generally two first linear strips are provided, one with the numbers increasing in value from the bottom to the top and the other with the numbers decreasing in value from bottom to top. Preferably, the zero mark of the strip is placed at approximately the median location of the strip.

A conversion kit also contains at least one second adhesive-backed linear strip approximately six inches in length. The length is approximately equal to the circumference of the one-tenth cent adjustment wheel located beneath the display wheels of the gasoline pump computer. This strip has numbers from zero to nine equally spaced thereon with the numbers oriented to be read when the strip is in a horizontal position. Again, a typical gasoline pump computer has two one-tenth cent adjustment wheels, one on each face of the computer. These wheels also turn in opposite directions so that the linear strips are provided so that on one strip the numbers increase in value from left to right while on the other strip the numbers decrease in value from left to right.

The strips referred to may be individual strips or they may be part of a larger sheet whereby individual strips are cut from or punched-out of said sheet.

Figure 1:
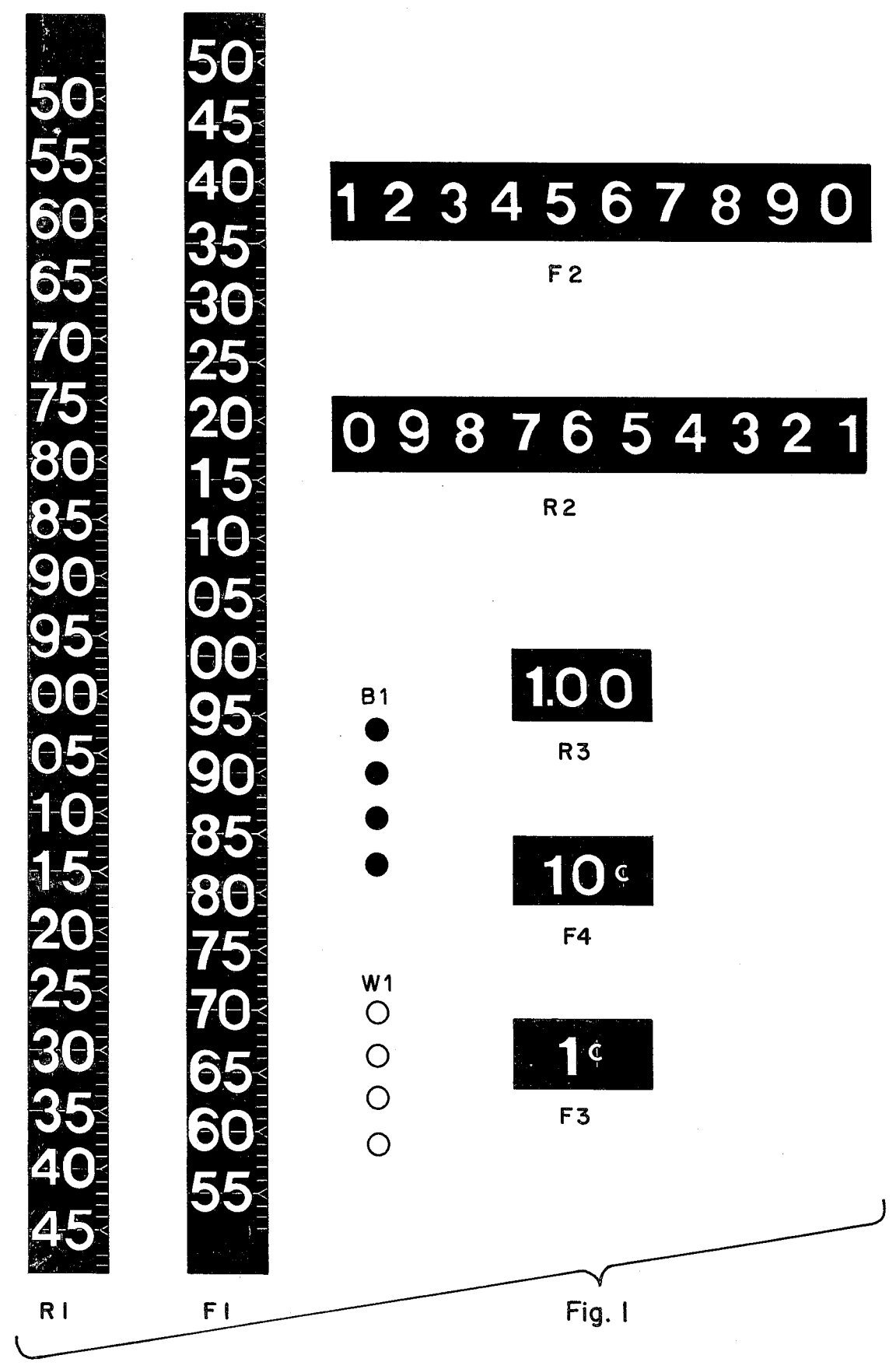

Further understanding of the invention may be facilitated by reference to the attached drawings. In FIG. 1, strips F-1 and R-1 are elongated numbered strips equally divided into 100 spaces with a slight over-length at one end which acts as a tab. Very large readable numbers are placed at every fifth division. On strip F-1 the numbers increase from number 55 through 95 and then from zero through 50. Strip R-1 reads from 45 decreasing to zero and then decreasing from 95 through 50. These strips are approximately one foot in length and are sized to fit around the one cent wheel of the typical display of a gasoline pump computer.

Also shown in FIG. 1 are strips F-2 and R-2. These are strips which are about six inches in length and are numbered from zero through one in decreasing values and from one through zero in increasing values, each as read from the left. These strips are attached to the one-tenth cent computer adjustment wheel. The strips are sized to be equal to the circumference of the computer adjustment wheel.

Also shown in FIG. 1 are strips F-3, F-4 and R-3. These strips contain, respectively, the designations one cent, ten cents and one dollar. These strips are placed adjacent to the price adjustment racks of the computer to demonstrate a change in the conversion of those racks from one-tenth cent, one cent and ten cents to one cent, ten cents and one dollar, respectively. The adjustment wheels rotate in response to movement of the lever which coacts with the price adjustment racks which are used to establish the price of a single gallon of gasoline.

FIG. 1 further illustrates the white dots W-1 and black dots B-1. These are transfer decals. The white dots are placed over the existing black dots on the face of a gasoline pump display to obscure the preexisting black dots. The black dot decals are then placed in the appropriate place on the pump display, as is illustrated in further drawings attached hereto.

FIG. 2 shows the face of a typical gasoline pump display panel which has been converted through the use of the instant conversion kit. The conversion kit changes the wheels at the extreme right of the panel to read from zero through 99 to display the sale price and the gallons pumped. The white dots W-1 have been placed over the existing decimals to obliterate them. Black dots B-1 have been placed between the center and right wheels to change the reading of the displays.

FIG. 3 generally illustrates the interior of a typical gasoline pump display prior to conversion. A computer 11 is illustrated. The computer 11 consists of an upper portion 11a and a lower portion 11b. The vertical wheels of the upper portion are the display portion of the computer. The upper right wheels show the sale value in one cent values from one to ten cents while the center wheels show the price in ten cent units while the left wheel is the dollar unit. In the lower series of vertical wheels the right wheel shows the gallons pumped as 1/10 of a gallon while the center wheel shows it in one gallon units and the left wheel shows the sale in tens of gallons.

The price adjustment wheels 12, 13 and 14 display the price charged per gallon. The price illustrated on the adjustment wheels is determined by the setting of the adjustment rack 15. The particular adjustment rack illustrated is the one-tenth cent rack. The rod or lever 16 is shown resting in the one-tenth slot of the rack. The rack has ten slots indicating numbers from one to zero. Moving the pin to the fifth slot rotates the adjustment wheel to show five-tenths cent. Thus, the adjustment wheel and the lever, are interconnected so that the wheel rotates in response to movement of the lever. Whenever an operator wants to change the price per gallon, he merely moves the lever in each adjustment rack. There are three adjustment racks. The adjustment racks for the one cent and ten cent wheels are not illustrated but are the same construction as the one-tenth cent rack.

FIG. 4 illustrates the pump display computer after conversion. The extreme right wheels have had strips F-1 applied to them. (The R-1 strips would be applied to the wheels on the opposite side of a computer display. The wheels on the opposite face rotate in an opposite direction to the wheels illustrated.)

Strip F-2 has been applied to wheel 12 and strip F-3 has been applied over the 1/10 cent mark of the computer adjustment rack 15. Pin 16 is in the second slot and the number two appears to the front on wheel 12.

The conversion kit may also be used without changing the extreme right wheel of the gallon display. Strip F-1 is applied to the extreme right wheel of the sale display wheel and strip F-2 is applied to the extreme right horizontal adjustment wheel. Also, strips F-3, F-4 and R-3 are applied to the respective adjustment racks. The decimal point is changed on the sale display wheels. Prior to conversion, the adjustment racks can only be adjusted to 99.9 cents. Once the strips are applied the adjustment racks can now be adjusted to $9.99 per gallon. Thus, the correspondence between the sale display wheels and the gallon display wheels is now changed by a factor of ten. For example, if gas is selling at $0.99 per gallon before conversion, the ten cent adjustment rack would set at nine, the one cent adjustment rack would be set at nine and the one-tenth cent would be set at zero. Thus, every time the gallon display wheels revolve to show the sale of one gallon, the sale display wheels would resolve to show $0.99. Thus, the center wheel of the display would have revolved 0.9 times while the left wheel would have revolved zero times and the one-tenth cent wheel would have revolved 9.9 times. To set the sale at 99 cents after conversion the one cent rack (formerly the one-tenth cent rack) will now be set at nine cents, the ten cents rack (formerly the one cent rack) would now be set at nine. In effect, the computer "believes" the sale price to be 9.9 cents. However, through the alteration of the sale display wheels and the adjustment wheel 12 by the provided strips from the conversion kit, the display for a one gallon sale would not be 9.9 cents but is now 99 cents. After conversion, a $0.99 sale would require that the far right wheel revolve 0.99 times and the center wheel revolves zero times.

FIGS. 5 and 6 illustrate a pair of substitute wheels. These wheels have numbers printed or engraved on them. These wheels may be substituted for either the one cent wheel or the 1/10 gallon wheel. The wheel of FIG. 5 is designed to be rotated counterclockwise while the wheel of FIG. 6 is numbered so as to be rotated clockwise.

The wheels of FIGS. 5 and 6 could be plain wheels to which one of the appropriate strips, e.g., strip F-1 or R-1 is attached prior to substitution in a display for an existing wheel.

The conversion kit of the instant invention is advantageous inasmuch as it can be utilized to increase the dollar value of a sale by tenfold. Also, it saves wear and tear on the computer inasmuch as the sale value wheels will now turn 1/10 as fast as previously. The kit can be used to modify conventional gasoline pump displays having three or four wheels to show the total value of a sale.

I claim:

1. A conversion kit for converting the display wheels appearing through the face of the display of a conventional gasoline pump having at least a one-tenth cent wheel, a one cent wheel and a ten cent wheel and an adjustment mechanism associated with each of said wheels to increase the money value display comprising:
    at least one first adhesive-backed linear strip (approximately one foot long) whose length is about equal to the circumference of the one cent wheel which conventionally reads from one cent to nine cents to display the cents portion of a particular sale, said strip being numbered from 0 to 95 with 100 equally spaced marks thereon, with numbers appearing in sequence at every fifth mark, said numbers oriented to be read when the strip is in a vertical position;
    at least one second adhesive-backed linear strip (approximately six inches long) whose length is about equal to the circumference of the one-tenth cent adjustment wheel; said strip having numbers from 0 through 9 equally spaced thereon, said numbers oriented to be read when the strip is in a horizontal position.

2. The kit of claim 1 wherein the adjustment mechanism has associated therewith indicia for each of said wheels, said indicia reading 10¢, 1¢ and 1/10¢ respectively and wherein further strips are provided containing the figures 1.00, 10¢ and 1¢ which are applied respectively to the 10¢, 1¢ and 1/10¢ indicia of the adjustment mechanism to cause said indicia to read 1.00, 10¢ and 1¢, respectively.

3. The kit of claim 1 wherein adhesive-backed black dots are provided to be installed on the face of the pump display to the left of the original one cent wheel which is convertible by means of the kit to read from zero to 99 cents.

4. The kit of claim 3 wherein adhesive-backed white dots are provided to be installed on the face of the pump display to cover preexisting dots which appeared on the face of the display in conjunction with said ten cent, one cent and one-tenth cent wheels.

5. The kit of claim 1 wherein two first adhesive-backed strips are provided, one strip with the numbers increasing in magnitude from bottom to top and another strip with the numbers increasing in magnitude from top to bottom.

6. The kit of claim 1 wherein two second adhesive-backed strips are provided, one strip with the numbers increasing in magnitude from left to right and another strip with the numbers increasing in magnitude from right to left.

7. The kit of claim 5 wherein the strip with increasing numbers begins at 55, increases through zero and continues to increase from 5 through 50 and the strip with decreasing numbers begins at 45, decreases through zero and continues to decrease from 95 through 50.

* * * * *